United States Patent [19]

Ort

[11] Patent Number: 5,192,938
[45] Date of Patent: Mar. 9, 1993

[54] STRAIN GAGE, TRANSDUCER EMPLOYING THE STRAIN GAGE, AND METHOD FOR PRODUCING THE STRAIN GAGE

[75] Inventor: Werner Ort, Darmstadt, Fed. Rep. of Germany

[73] Assignee: Hottinger Baldwin Messtechnik GmbH, Darmstadt, Fed. Rep. of Germany

[21] Appl. No.: 681,579

[22] Filed: Apr. 5, 1991

[30] Foreign Application Priority Data

Apr. 7, 1990 [DE] Fed. Rep. of Germany ....... 4011314

[51] Int. Cl.[5] ............................................. G01L 1/22
[52] U.S. Cl. .......................................... 338/5; 338/3; 338/4; 73/774; 73/776; 73/862.627
[58] Field of Search ........................... 338/4, 2, 5, 3

[56] References Cited

U.S. PATENT DOCUMENTS 4,322,707  3/1982  Ort .
4,838,089  6/1989  Okada et al. ................... 338/4 X

FOREIGN PATENT DOCUMENTS 1072217   2/1980   Canada .
31773655  12/1971  Fed. Rep. of Germany .
2902242   7/1980   Fed. Rep. of Germany .
2902244   7/1980   Fed. Rep. of Germany .
2916425   7/1980   Fed. Rep. of Germany .
2916427   10/1980  Fed. Rep. of Germany .
640346    12/1983  Switzerland .
728606    4/1955   United Kingdom .

OTHER PUBLICATIONS

Brochure entitled "PPS FILM Torelina®"; cover page and pp. 2 to 9.
Publication "msr", Article entitled: Sensoren mit organischer Komponente (Sensors With An Organic Component), Berlin 31 (1988), Nr. 8, pp. 345 to 347 by C. Hamann.
DIN IEC 68, Part 2-30, Sep. 1981, pp. 1 to 8.
*Physikalisch-Technische Bundesanstalt; Article Entitled: "Pruefung von Dehnungsmesstreifen-Waegezellen" (Testing Foil Strain Gage Weighing Load Cells), by Meissner et al.; (*German Bureau of Standards), Report Me-30, Dec. 1981.

Primary Examiner—Marvin M. Lateef
Attorney, Agent, or Firm—W. G. Fasse

[57] ABSTRACT

A strain gage or a measuring transducer equipped with such a strain gage has, for supporting the measuring grid structure, a backing made of a polyphenylenesulfide film. Such a backing assures a plurality of desirable characteristics simultaneously and equally well for each characteristic.

8 Claims, 3 Drawing Sheets

STRAIN GAGE, TRANSDUCER EMPLOYING THE STRAIN GAGE, AND METHOD FOR PRODUCING THE STRAIN GAGE

FIELD OF THE INVENTION

The invention relates to a strain gage having a measuring grid arranged on a backing. The invention also relates to a force transducer comprising such a strain gage.

BACKGROUND INFORMATION

Strain gages of the above type are known from British Patent (GB-PS) 728,606. A measuring grid in the form of a resistor meander having contact tabs or solder tabs at its ends, is photolithographically etched out of a very thin, rolled metal foil, whereby the metal foil is connected to a second metal foil. After the etching an insulating epoxy resin backing is applied to the first metal foil and the second metal foil is removed. Problems are encountered in the manufacture, handling and application of strain gages with an epoxy resin backing because the epoxy resin backing is brittle and thus prone to breaking. Using such conventional strain gages in connection with transducers for measuring forces requires an especially careful handling. The use of such transducers in connection with stress analysis is not conventional. These problems are also present in connection with foil strain gages having a phenolic resin backing.

Further, foil strain gages are known which comprise a glass fiber reinforced backing of epoxy resin or phenolic resin. The elastic characteristics of such foil strain gages are improved based on the characteristics of fiber composite materials. However, due to a non-uniform quality of the fiber reinforcing material and due to thickness variations and structural faults, there are substantial impairments in the characteristic values of force transducers equipped with such foil strain gages. Especially it is not possible to predetermine the creep characteristics and hence these characteristics cannot be easily controlled.

According to German Patent Publication 2,916,427, corresponding to U.S. Pat. No. 4,322,707 (Ort) a foil strain gage transducer is known wherein creep characteristics are individually compensated for each gage element, whereby special foil strain gages are used, so that the effort and expense is correspondingly substantial. Faults in the glass fibers, such as small knots, glass clumps, or soiling of the glass fibers lead to a substantial waste in the manufacture of such conventional foil strain gages.

In another type of foil strain gage according to German Patent Publications 2,902,242 and 2,902,244 (Ruecker et al.) both the backing and the so-called encapsulation forming together a matrix, are made of synthetic material namely polyimide, whereby either respective films are adhesively bonded to the measuring grid foil or the metal foil is coated with the resin which is then cured. The measuring grid is made of an alloy of gold, palladium, and vanadium. This technique provides very robust foil strain gages because the matrix material is very flexible and has a high tear resistance. Such foil strain gages are preferably used for stress analysis. However, these strain gages are not suitable for the construction of precision force transducers because they creep too much. In German Patent Publication 2,902,242 (Ruecker et al.) the backing of polyimide is covered on its surface opposite the measuring grid foil with a solderable layer.

All three types of the above mentioned foil strain gages have the drawback that they are sensitive to moisture because the matrix swells or shrinks in response to the humidity of the atmosphere. Resistance changes of the foil strain gages are the result, whereby the zero load output of the respective transducer is uncertain. This characteristic of the above strain gages alone is a substantial drawback. Additionally, it prevents a precise adjustment of the thermal zero shift (TC zero). Additionally, the creeping error of transducers equipped with such foil strain gages is temperature dependent. All these characteristics together lead to enormous difficulties in the development and production of precision force transducers.

With regard to the above mentioned German Patent 2,916,427 corresponding to U.S. Pat. No. 4,322,707 (Ort), it is possible to compensate for the creeping of the transducer, by using special foil strain gages. However, that approach resides substantially in displacing the creeping characteristic as a function of temperature parallel to the temperature axis. It has not been possible heretofore to influence the shape of the characteristic or curve itself in a purposeful manner.

German Patent Publication 2,916,425 (Utner et al.) discloses a foil strain gage and a method for its production, wherein a measuring grid resistor is bonded in a material locking bond to a thin synthetic material film. The material locking bond is accomplished by a vapor deposition or sputtering. The synthetic material film is polyimide because it is capable of withstanding soldering temperatures and other heat treatment temperatures.

Swiss Patent Publication 640,346 (Krempl et al.) discloses a measuring transducer comprising a multi-layer structure including at least one flexible piezoelectric film made of a monoaxially oriented polymer. A multitude of polymers having suitable piezoelectric characteristics are mentioned such as PVDF, PVF, PVC, PAN, PMMA, FEP, PE and others. No suggestions are made with regard to an improved, temperature independent creep characteristic.

The publication "msr", Berlin 31 (1988), Nr. 8, pages 345 to 347 by Hamann, discusses "Sensors With An Organic Component", whereby numerous polymers are mentioned in passing. Moisture sensors, gas sensors, field effect transistors for use as chemical analysis sensors, optical sensors, piezoelectric sensors for various purposes and biological sensors are discussed without any mention of solving creep problems.

Polyphenylenesulfide is known as such. Reference is made to a brochure entitled "PPS Film Torelina ®", published by the firm Toray. Numerous characteristics and uses of PPS are mentioned in this brochure. The characteristics of PPS include a high temperature, chemical, and radiation resistance, and a high dielectric constant. These characteristics make PPS films suitable for for high temperature capacitors, flexible printed circuit boards and other purposes. The superior characteristics of PPS discovered by the present inventor, for use in foil strain gages and transducers equippped with such foil strain gages are conspicuously absent from the manufacturer's own brochure.

The manufacturer has not recognized the superior creeping characteristics of PPS film and there is no suggestion in the Toray brochure toward the present invention.

The market calls for cheaper foil strain gages and less expensive, yet improved force transducers. The requirements to be met by multi-range scales, for example, call for substantial improvements in the creep specifications, in the temperature response characteristic of the zero load output signal, in the linearity, and in the hysteresis. All of these requirements cannot be satisfied simultaneously by conventional foil strain gages. Further, conventional foil strain gages have the drawback that they cannot achieve a plurality of desirable characteristics simultaneously and equally well. When conventional strain gages have one good characteristic, other desirable characteristics are lacking and vice versa.

OBJECTS OF THE INVENTION

In view of the foregoing it is the aim of the invention to achieve the following objects singly or in combination:

to provide a foil strain gage which does not have the above outlined disadvantages of conventional foil strain gages;

to construct a foil strain gage that is robust in its use and easy to manufacture without faults, yet suitable for precision applications in stress analysis and in force transducers;

to construct a transducer or load cell using the present improved foil strain gage, which has substantially improved measuring characteristics, and which can be manufactured more economically; and to positively influence strain gage characteristics including its temperature response, more specifically to provide a strain gage that has at least five excellent characteristics simultaneously and achieves each of these characteristics equally well, namely a stable zero load signal or output, a consistent repeatability of measurements, excellent temperature and moisture independent creep characteristics, a robust structure even with regard to chemical resistance, and it shall be inexpensive.

SUMMARY OF THE INVENTION

These objects have been achieved according to the invention in that the backing of the foil strain gage is made of a polyphenylenesulfide (PPS) film. Transducers according to the invention have at least one strain gage with a PPS backing carrying at least one measuring resistor grid structure.

The backing, and if applicable the cover layer also referred to as encapsulation, are made of an insulating flexible polyphenylenesulfide film which has practically no faults on its entire surface area and a uniform thickness as well as a biaxial orientation. Such a PPS foil has, compared to conventional backings, a noticeably reduced water permeability by diffusion and a substantially smaller tendency to swell. The invention assures that variations conventionally caused by humidity or humidity changes do not influence the resistance of the foil strain gage, wherein the grid structure is bonded, for example adhesively bonded, to the PPS backing. These features noticeably increase the precision of measurements achieved with metal foil strain gages used in stress analysis as well as the measuring precision of transducers using the new strain gages with a PPS backing compared to conventional transducers.

The improved performance precision is due to the fact that the no load output remains stable independent of temperature and moisture changes and thus the thermal zero shift or drift can be determined more precisely and compensated, if necessary. This feature of the invention is especially important for load cells used in multi-range scales in which the thermal output tolerance is substantially reduced, for example, to 40% of a conventional retail scale on a scale having a first range from zero up to 6 kg with a resolution of 2 g (grams) and a second range from 6 kg to 15 kg with 5 g resolution. Additionally, the production costs of the present strain gages and transducers have been substantially reduced compared to conventional strain gages and transducers, because in many instances it is no longer necessary to provide a hermetical seal, which leads to a substantially simplified construction and much simpler manufacturing conditions since sealing problems are avoided. An oxidation of the measuring grid embedded between the polyphenylenesulfide films is practically no longer noticeable within the operating temperature range of such load cells. Permanent resistance changes of the measuring grid caused by oxidations with a disadvantageous influence on the zero shift of the transducer no longer occur.

Surprisingly, the present transducers with PPS foil strain gages according to the invention satisfy current requirements of German Official moisture tests even when the present transducers are not hermetically sealed. Details of such moisture tests are disclosed in DIN IEC 68, part 2-30, September 1981, pages 1 to 8 enclosed herewith. It is entirely unexpected that these stringent official test conditions are satisfied by strain gages and transducers of the invention even without any need for additional measures such as a protective coating. For the formation of the measuring grid by means of etching processes, the excellent resistance of polyphenylenesulfide against chemical attack is another very important advantage of the invention.

Another surprising advantage achieved according to the invention resides in the fact that the element to element variation of the creeping error is so small that the present foil strain gages can even be used for multi-range load cells, e.g. for weighing scales after a global adjustment of the average creeping error, for example, in accordance with the teaching of German Patent Publication (DE) 2,916,427, corresponding to U.S. Pat. No. 4,322,707 (Ort) mentioned above. In connection with multi-range load cells for a retail scale, the creeping error has been reduced by a factor of about 2/5 or about 40% compared to a load cell which is suitable only for one scale weighing range. Achieving such a small creeping error was not at all to be expected, due to the creeping errors in comparable foil strain gages having backings made of polyimide or polyamidimide. The most important unpredictable advantage of the polyphenylene sulfide film material for backings and cover layers or encapsulations of foil strain gages is seen in the fact that the temperature dependence of the creeping error of conventional strain gages and transducers has been nearly completely eliminated according to the invention. The discovery of these beneficial characteristics of PPS film for the present purposes is the result of a "shot in the dark" so-to-speak and rather unexpected. Due to the small creeping error and its negligible temperature dependency, it is now possible to omit the heretofore required individual testing of transducers, provided these transducers are equipped with PPS strain gages according to the invention. Instead of individually testing each transducer, it is now possible to monitor the quality by statistical quality control methods, whereby the efforts and expenses for the testing has been substantially reduced, thereby reducing the manufacturing costs. Further, the number of rejects that has been produced heretofore by selecting only those transducers having a higher quality, has been obviated. This feature alone provides a substantial cost advantage.

The foil strain gage according to the invention has still other advantageous characteristics. Hysteresis errors have not been noticed. The zero load output is precisely and consistently reproducible even if a high measuring resolution of, for example 20,000 divisions, is required. Since the characteristics are very well reproducible, it is possible to employ simple adjustment measures which lead to very precise measuring transducers. Another advantage is seen in that the present foil strain gage can be manufactured simply and substantially free of faults. Even an automatic mass production is possible because the mechanical characteristics of the PPS films permit a handling without problems as well as an automated manufacturing process. The cost advantages in combination with the significant increase in quality and precision of the strain gages and transducers are most unexpected because conventionally high quality especially in combination with high precision was considered to be attainable only, if at all, at a high cost.

Foil strain gages having a PPS backing and force transducers equipped with such foil strain gages according to the invention pass standardized moisture tests surprisingly well, while maintaining all the other advantageous characteristics mentioned above, especially the excellent creep characteristics.

The most important advantage of the foil strain gages according to the invention is seen in that for the first time all essential specification requirements that must be met by such foil strain gages, are satisfied simultaneously and each of these requirements is satisfied with equal quality.

BRIEF DESCRIPTION OF THE DRAWINGS

In order that the invention may be clearly understood it will now be described with reference to the accompanying drawings, wherein.

DETAILED DESCRIPTION OF PREFERRED EXAMPLE EMBODIMENTS AND OF THE BEST MODE OF THE INVENTION

Figure 1:
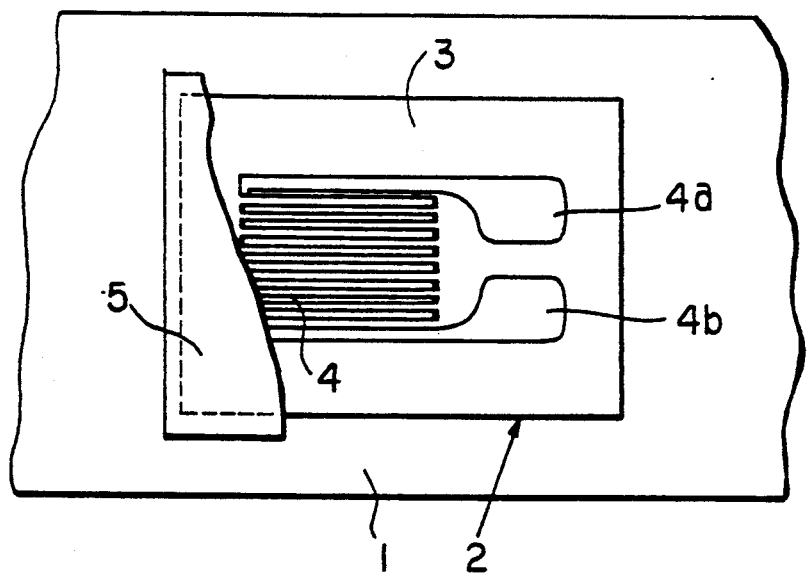
FIG. 1 is a measuring transducer with a foil strain gage according to the invention.

According to FIG. 1, a foil strain gage 2 is applied to a spring support of a transducer. The foil strain gage 2 comprises a backing layer 3 of polyphenylenesulfide as taught by the invention, a measuring resistor grid 4 forming the strain responsive resistor means and, if desired an encapsulating or cover layer 5, preferably also of polyphenylenesulfide. The layer 5 is shown broken away in FIG. 1. The measuring resistor grid 4 comprises a meandering arrangement of grid lines of a thin metal layer or foil, for example, made of constantan. The ends of the strain responsive resistor grid 4 form contact or soldering tabs 4a, 4b which are connectable to an evaluating circuit, for example, in the form of a Wheatstone bridge circuit.

In the construction of transducers four of such foil strain gages are normally used and electrically interconnected to form a Wheatstone bridge. The measuring resistor grid 4 is formed of a respective metal foil, for example, by etching. The metal foil in turn is arranged on the backing 3 to which it is intimately bonded, for example, by an adhesive layer such as epoxy or a phenolic resin.

According to the invention the backing 3 is a melt extruded, partially crystalline, biaxially oriented polyphenylenesulfide film having a thickness of about 25 $\mu$m. The polyphenylenesulfide has ideal characteristics for the present purposes, such as an especially small moisture absorption of about 0.05% when the relative humidity of the environment is 75%. The polyphenylenesulfide film swells only very little in the presence of moisture, in other words it has a very small moisture absorption. The respective value of the hygroscopic expansion coefficient is smaller than $2\times 10^{-6}$m/m/% relative humidity. The hygroscopic expansion coefficient indicates a relative length change of the film strip when the relative humidity of the atmosphere to which the film is exposed, changes by 1 percent. The polyphenylenesulfide film is chemically very resistant which is advantageous for forming the measuring resistor grid 4 out of a metal foil by means of lithographic processes or chemical etching processes.

As mentioned, the foil strain gage 2 may be provided with a so-called encapsulation layer 5 also of polyphenylenesulfide after the measuring grid 4 has been formed, whereby the measuring grid 4 is embedded between two polyphenylenesulfide layers 3 and 5. The covering layer in the form of a film can be bonded to the backing 3, for example, by adhesive or by a hot pressing operation. The layer 5 has a thickness within the range of about 10 to 25 $\mu$m so that the total thickness of the foil strain gage is within the range of 35 to 50 $\mu$m plus the thickness of the measuring grid 4.

According to the invention the polyphenylenesulfide film can also be used as a backing for foil strain gages in which the measuring grid is, for example, formed by vapor deposition or sputtering in a vacuum, by applying a masking for the measuring grid structure to the backing 3.

For forming a transducer, the foil strain gage 2 is applied to the spring body 1, e.g. by adhesively bonding the two together. The resulting transducer may, for example, be used in the load cell of a weighing scale.

Special advantages are provided by the foil strain gage transducer according to the invention particularly in connection with its use in a platform load cell for multi-range scales. A platform load cell with a spring 1 inherently has the guide functions that are required for such scales as platform scales carrying the load on a so-called spider and platform. Thus, a platform weighing load cell of the invention obviates the mechanical guide elements required heretofore.

Figure 2A:
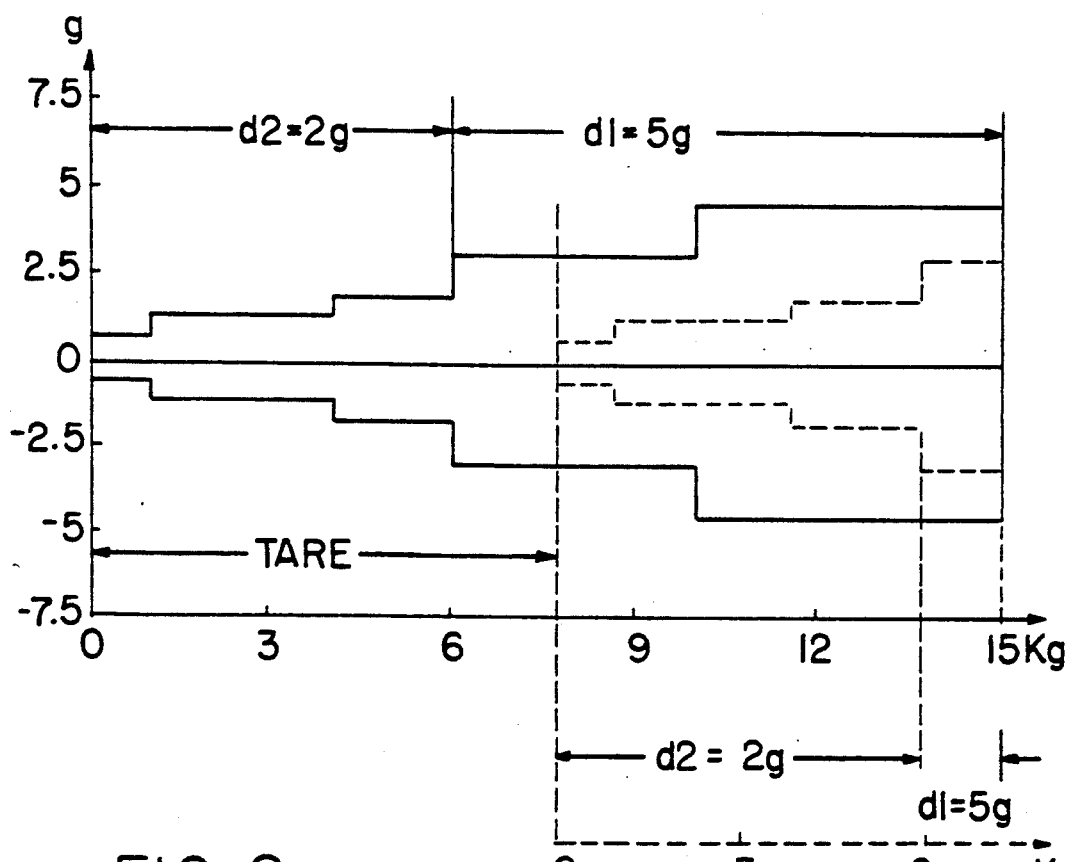
FIG. 2a show the error distribution band of a multi-range load cell for a scale.

Multi-range scales are dimensioned for at least two scale ranges, each with a different division d which is the spacing between two successive indication values. Such a scale operates automatically with the smaller division d2 in an initial scale range independently of any taring and switches automatically to the coarser division d1 as soon as the initial range is exceeded. Referring to the example of the most commonly used retail scales, the initial scale range reaches up to 6 kg with a division d2=2 g. If the load exceeds 6 kg, the scale switches to the coarser division d1=5 g as shown in FIG. 2a and in FIG. 2b, for the remaining scale range up to 15 kg. When the tare weight is placed on the scale, the scale is tared and thereafter the initial weighing range is also within the fine scale division. However, the tare load reduces the available weighing range correspondingly. FIG. 2a shows the allowable error band for the mentioned weighing load cell. The allowable error band is the permissible tolerance or deviation from the ideal characteristic over the operational temperature range for weighing load cells used in scales of Class III according to the German Bureau of Standards or in Class C according to OIML (Organization Internationale de Metrologie Legale). Generally, the error band of the weighing load cells corresponds to 70% of the calibration error limits of the scale which has also been assumed in this case.

Dashed lines in the right-hand part of FIG. 2a to show the relationships when a tare load is placed on the scale. It is seen that the permissible tolerance for the creeping error or for the corresponding zero load drift is substantially reduced because this error is load dependent and the reduced error range of the initial load is applicable even when the tare load is on the scale. The tolerance of the thermal zero drift is also substantially reduced to 2/5 or 40% in the shown example compared to a scale having but one scale division of 5 g between neighboring division indications, for example, in a digital display.

Figure 2B:
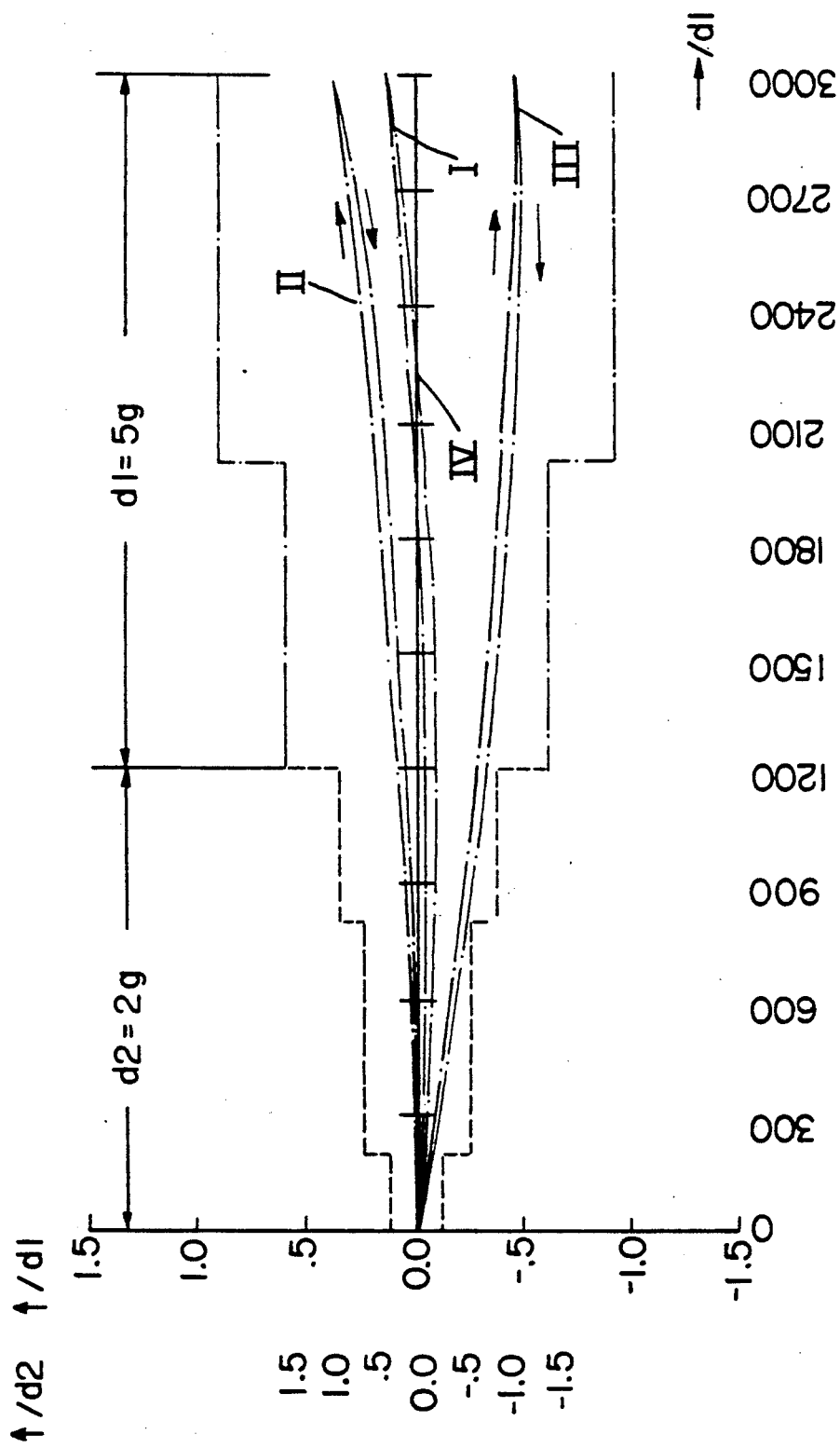
FIG. 2b illustrates the error band of a multi-range load cell for a scale, including the characteristics for loading followed by unloading at different temperatures.

In FIG. 2b the error band is entered in the division units d1 or d2 for a scale with a weighing load cell having a multi-range capability according to the example. The curves I to IV shown in FIG. 2b represent the deviations measured on a weighing load cell for the above mentioned retail scale, when a load is applied that ranges from zero to the maximal load, and which is then removed from the scale. This is indicated in FIG. 2b by the oppositely pointing arrows next to curves II and III which are shown in a spread-out manner for clarity of illustration. Curve I was measured at +20° C. Curve II was measured at −10° C. Curve III was measured at +40° C., and curve IV was measured at +20° C. In all four instances the weighing load cell was provided with a strain gage having a polyphenylenesulfide backing according to the invention.

From the illustration of FIG. 2b it is evident that the zero point for the curves I to IV is reached exactly at all temperatures, or is again reached, which means that the measuring results are stable over time and consistently and exactly reproducible.

Figure 3A:
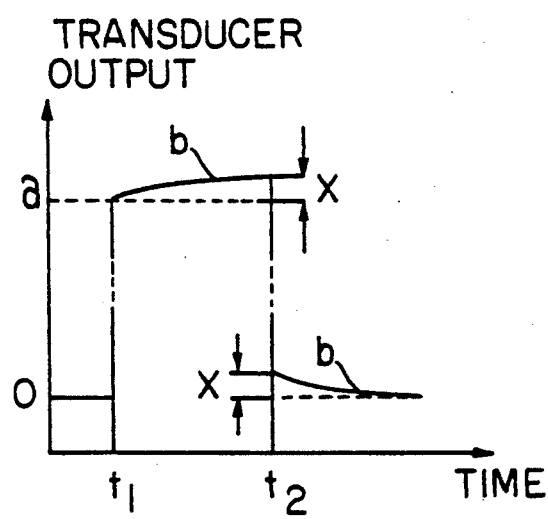
FIG. 3a is a schematic illustration for explaining the creeping in response to loading followed by creep recovery in response to unloading as a function of time.

FIG. 3a shows a principle illustration for the load dependent creeping of a weighing load cell. The Y-axis or ordinate represents the transducer output signal and the X-axis or abscissa represents time. At the point of time $t_1$ a definite load is applied to the scale, thereby causing the signal jump "a". At the point of time $t_2$ the load is removed from the scale. The load dependent creeping is represented by the value x which may be especially easily ascertained by measuring the corresponding creep recovery after removal of the load.

Figure 3B:
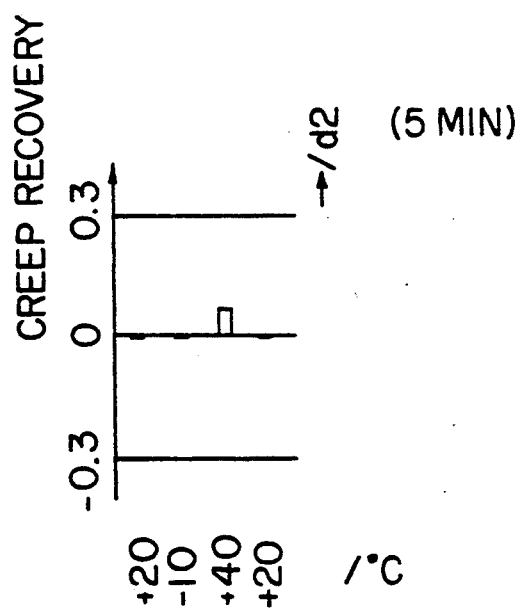
FIG. 3b is a schematic illustration of the creep recovery following a short duration loading at different temperatures including room temperature, and the required extreme temperatures of $-10°$ C. and $+40°$ C.

FIG. 3b shows a bar graph or bar chart in which the load dependent creeping is illustrated for a loading duration of 5 minutes at different temperatures, +20° C., −10° C., +40° C., +20° C. The ordinate indicates the creep recovery in units of the division d2. The permissible error limit of the creep recovery, which is easier to measure than the creeping, is established at 0.5 d2 within 30 minutes by the German Bureau of Standards (Physikalisch-Technische Bundesanstalt) Report ME-30, by Meissner et al. entitled "Testing Foil Strain Gage Weighing Load Cells", December, 1981, a copy of which is enclosed.

For the measurement over 5 minutes only, the tolerance was reduced to 0.3 d2. The weighing load cell for the above mentioned retail scale satisfies the requirements over the entire operational temperature range surprisingly well. The load cell used in the scale comprised a spring body 1 of CuBe spring material and a foil strain gage with a matrix material of polyphenylenesulfide film as taught herein. The creeping error is very small and can additionally be compensated, for example, by the measures disclosed in German Patent 2,916,427 mentioned above.

FIG. 3b further shows that the creeping error is hardly temperature dependent anymore having regard to the permissible tolerance of 0.3 d2. Further, research has shown that the creeping is moisture dependent only to a negligible extent.

For verifying the foregoing the weighing load cell used in the above tests was first dried over a prolonged period of time by a zeolite used as a drying agent. Thereafter, the creep recovery was measured at different temperatures. Thereafter, the load cell was exposed again for a prolonged period of time to the normal atmosphere and then the creep recovery was measured again for different temperatures. Surprisingly, the measured changes were minimal and the creep recovery remained temperature independent even at different degrees of humidity.

Due to the small creeping error and its negligible dependence on temperature, it is now possible to obviate individual testing of the present load cells and to perform the quality monitoring solely by statistical methods. A weighing load cell equipped with foil strain gages of polyphenylenesulfide satisfies uniformly and surprisingly well all requirements that must be met by a weighing load cell for calibratable scales. Therefore, the foil strain gages according to the invention and load cells equipped therewith are exceptionally suitable for use, particularly in multi-range scales.

Although the invention has been described with reference to specific example embodiments, it will be appreciated that it is intended to cover all modifications and equivalents within the scope of the appended claims.

I claim:

1. A strain gage, comprising a backing and at least one strain responsive measuring resistor grid secured to said backing, and wherein said backing is formed of polyphenylenesulfide, whereby said strain gage is substantially free of spurious error signals caused by changes in the relative humidity to which said strain gage is exposed in operation.

2. The strain gage of claim 1, wherein said polyphenylenesulfide backing has a thickness within the range of about 10 to 25 micron.

3. The strain gage of claim 1, further comprising a cover layer of polyphenylenesulfide covering said measuring grid.

4. The strain gage of claim 3, wherein said cover layer of polyphenylenesulfide has a thickness within the range of 10 to 25 micron.

5. A transducer for measuring forces or loads, comprising at least on strain gage including a backing of polyphenylenesulfide and at least one measuring resistor grid secured to said backing of polyphenylenesulfide, said transducer having a performance characteristic which is substantially independent of changes in the relative humidity of the surrounding atmosphere and a creep performance within the range of its operating temperature.

6. The transducer of claim 5, wherein said polyphenylenesulfide backing has a thickness within the range of about 10 to 25 micron.

7. The transducer of claim 5, further comprising a cover layer of polyphenylenesulfide covering said measuring grid.

8. The transducer of claim 7, wherein said cover layer of polyphenylenesulfide has a thickness within the range of 10 to 25 micron.

* * * * *

UNITED STATES PATENT AND TRADEMARK OFFICE
CERTIFICATE OF CORRECTION

PATENT NO. : 5,192,938

DATED : March 9, 1993

INVENTOR(S) : Werner Ort

It is certified that error appears in the above-identified patent and that said Letters Patent is hereby corrected as shown below:

Column 9, line 8, replace "on" by --one--.

Signed and Sealed this

Fourteenth Day of June, 1994

*Attest:*

BRUCE LEHMAN

*Attesting Officer*     *Commissioner of Patents and Trademarks*